United States Patent
Smolyar et al.

(10) Patent No.: US 6,314,130 B1
(45) Date of Patent: Nov. 6, 2001

(54) SYSTEM AND METHOD FOR JOINT TIME TRACKING OF MULTIPLE PATHS

(75) Inventors: Lev Smolyar, Haifa; Danny Yellin, Karmei Yosef; Doron Rainish, Ramat Gan, all of (IL)

(73) Assignee: DSPC Technologies, Ltd., Petach Tikva (IL)

( * ) Notice: Subject to any disclaimer, the term of this patent is extended or adjusted under 35 U.S.C. 154(b) by 0 days.

(21) Appl. No.: 09/301,116

(22) Filed: Apr. 28, 1999

(51) Int. Cl.⁷ .............................. H04L 27/30; H04L 27/06
(52) U.S. Cl. .............................. 375/150; 375/343
(58) Field of Search .................... 375/150, 147, 375/149, 130, 140, 142, 367, 343; 370/320, 335, 342, 441

(56) References Cited

U.S. PATENT DOCUMENTS

| | | |
|---|---|---|
| 5,349,606 | 9/1994 | Lovell et al. . |
| 5,648,983 | 7/1997 | Kostic . |
| 5,675,616 | 10/1997 | Hulbert et al. . |
| 5,692,006 | 11/1997 | Ross . |
| 5,764,688 | 6/1998 | Hulbert et al. . |
| 5,793,796 | 8/1998 | Hulbert et al. . |
| 6,078,611 | * 6/2000 | La Rose et al. ............ 375/206 |

FOREIGN PATENT DOCUMENTS

| | | |
|---|---|---|
| 0704985 A2 | 4/1996 | (EP) . |
| WO 94/28640 | 12/1994 | (WO) . |

OTHER PUBLICATIONS

L. Dumont et al. "Super–resolution of Multipath Channels in a Spread Location System", *Electronic Letters*, vol. 30, No. 19, Sep. 15, 1984.

Makato Takeuci et al., "A Delay Lock Loop Using Delay Path Cancellation for Mobile Communications", *Electronic Communication in Japan*, Part 1, vol. 79, Nov. 4, 1996.

* cited by examiner

*Primary Examiner*—Chi Pham
*Assistant Examiner*—Khai Tran
(74) *Attorney, Agent, or Firm*—Eitan, Pearl, Latzer & Cohen-Zedek

(57) ABSTRACT

In a receiver having at least two fingers, the fingers tracking at least one path of a multipath channel, a method includes the steps of forming a finger block of at least two of the two fingers and jointly tracking the fingers of said finger block. The step of jointly tracking includes the steps of generating direction metrics of each of a set of possible directions of joint movement of the fingers of the finger block, selecting one of the direction metrics according to a predetermined criterion, and moving the fingers of the finger block in the directions indicated by the selected direction metric.

15 Claims, 10 Drawing Sheets

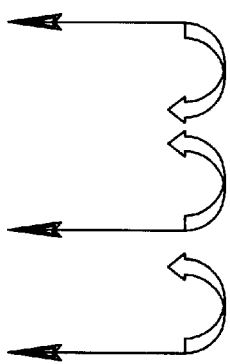
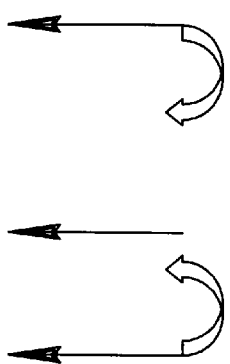
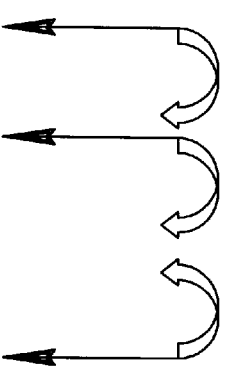
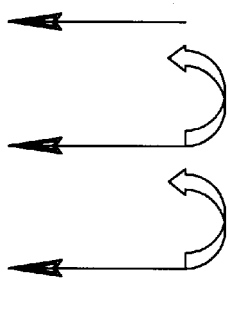
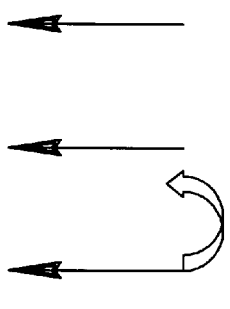
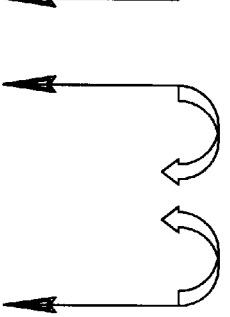
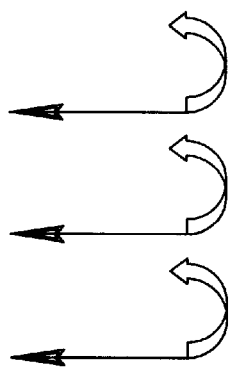
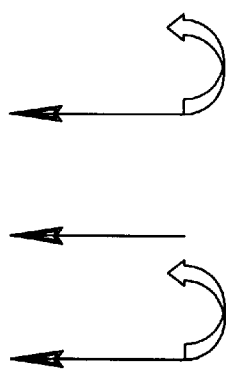
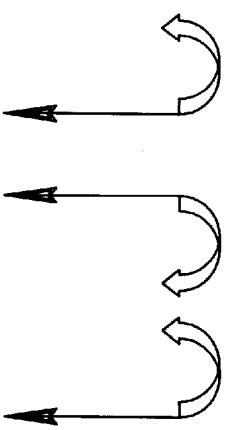
FIG.2B

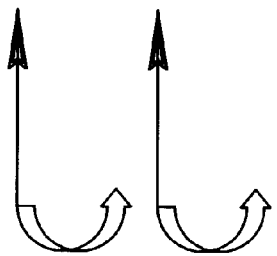
DIRECTION 1
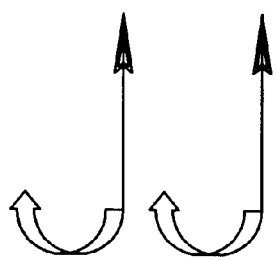
DIRECTION 2
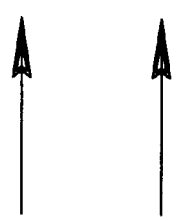
DIRECTION 3
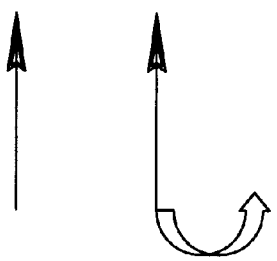
DIRECTION 4
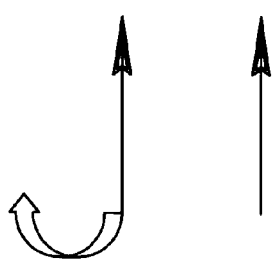
DIRECTION 5
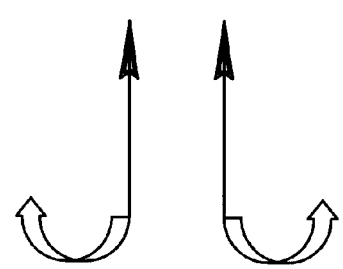
DIRECTION 7
FIG.4

SYSTEM AND METHOD FOR JOINT TIME TRACKING OF MULTIPLE PATHS

FIELD OF THE INVENTION

The present invention relates to systems and methods for tracking the delays of channel paths in general and of jointly tracking the time delays of multiple paths (multipath components) in particular.

BACKGROUND OF THE INVENTION

In recent years, direct sequence (DS) code division multiple access (CDMA) spread spectrum communication systems and methods have experienced growing attention worldwide. The IS-95 cellular communication standard is one example of an application of DS-CDMA communications, as described in the article TIA/EIA/IS-95-A, "Mobile Station-Base Station Compatibility Standard for Dual-Mode Wideband Spread Spectrum Cellular System", Feb. 27, 1996. Additional applications include third generation cellular systems, wireless multimedia systems, personal satellite mobile systems, and more.

In DS-CDMA communications, each user is assigned a distinct spreading code often referred to as pseudo noise (PN) sequence. The spreading code bits (called chips) are used to modulate the user data. The number of chips used to modulate one data symbol is known as the spreading factor of the system, and it is related to the spreading in bandwidth between the (unmodulated) user data and the CDMA signal. In this simplest form, the base-band equivalent of the transmitted CDMA signal, sampled at the chip rate 1/Tc, is $$T[n] = \sum_{i=1}^{k} a_i[\lfloor n/SF \rfloor] \cdot PN_i[n],$$

where Tc is the chip duration, $\lfloor x \rfloor$ denotes the integer part of x, SF is the spreading factor, $a_i[\lfloor n/SF \rfloor]$ and $PN_i[n]$ are the data symbol and spreading code of the i-th user, respectively, and K is the number of active users. Note that by the definition of $\lfloor x \rfloor$, $a_i[\lfloor n/SF \rfloor]$ is fixed for SF consecutive chips, in accordance with the definition above that each data symbol is modulated by SF chips.

An important feature of DS-CDMA systems is that they provide the possibility of obtaining excellent immunity to multipath fading through resolving the individual, time separated multipath components and optimally combining them. The common approach for achieving this is to use a "rake" receiver as it is known in the art. Such a receiver assigns despreading correlators to each of the dominant multipath components and synchronizes them for maximum de-spread power. For each of the rake "fingers", the phase and amplitude of the corresponding channel multipath component is estimated and used to apply amplitude weighting and phase alignment prior to combining. The weighted sum of the multipath components will experience considerably less fading than any of the individual components so that a diversity gain is obtained.

As is known in the art, a crucial requirement of the rake receiver is that its fingers are time aligned (synchronized) with the multipath components of the channel. This requires estimation of the multipath delays and is often achieved by a simple early-late time tracking mechanism. The early-late mechanism is, in fact, a delay-lock-loop that measures the energy prior (early) and after (late) the current sampling instances. These early and late energy measurements are used to lock on the sampling instance that maximizes the sampled signal energy. As it turns out, these maximal energy sampling instances leads, in many cases, to the desired synchronization of the rake fingers to the channel multipath components. However, some channels, for example those encountered in dense urban environments, consist of a large number of closely spaced multipath components. This leads to multipath clusters that are often spaced less than Tc apart. Conventional early-late time tracking mechanism are often incapable of tracking the delays associated with those closely spaced multipath clusters since their early and late measures are a superposition of the energies associated with several adjacent clusters. In such a situation, the rake fingers are not properly time aligned with the multipath clusters, leading to degradation in the receiver performance.

It would therefore be beneficial to have an improved time tracking mechanism that is more robust to the presence of closely spaced multipath components.

It would also be beneficial to have an improved criterion for finger assignment in closely spaced multipath environment.

In recent years several methods for combating closely spaced multipath components in DS-CDMA communication systems were derived. In U.S. Pat. No. 5,692,006 to Ross, U.S. Pat. No. 5,648,983 to Kostic et al. and U.S. Pat. No. 5,793,796 to Hulbert et al. it is suggested to avoid direct estimation of the path delays, Instead, a bank of closely spaced fingers is utilized to effectively cover a pre-specified delay window. Thus instead of actually estimating the multipath delays all possible delays in the window are examined and weighted according to some quality measure criterion. In U.S. Pat. No. 5,692,006 a conventional LMS algorithm is used to adaptively estimate optimal finger weighting, whereas in U.S. Pat. No. 5,648,983 a weighted least squares solution is used to assign the finger weights.

Other solutions can be found in:
EP Patent Publication 704 985 A2 to Hulbert;
U.S. Pat. No. 5,764,688 to Hulbert et al.;
I. Dumont, et al., "Super-resolution of Multipath Channels in a Spread Spectrum Location System", *Electronics Letters*, Vol. 30, No. 19, Sep. 15, 1984; and
Makoto Takeuchi et al., "A Delay Lock Loop Using Delay Path Cancellation for Mobile Communications", *Electronics and Communication in Japan*, Part 1, Vol. 79, No. 4, 1996.

SUMMARY OF THE INVENTION

The present invention provides an improved time tracking mechanism that is more robust in the presence of closely spaced multipath components.

The present invention also provides a criterion for finger assignment in a closely spaced multipath environment.

There is therefore provided in accordance with a preferred embodiment of the present invention a method used in a receiver having at least two fingers forming a finger block, the finger block tracking at least one path of a multipath channel. The method includes the steps of generating direction metrics of each of a set of possible directions of joint movement of the fingers of the finger block, selecting one of the direction metrics according to a predetermined criterion, and moving the fingers of the finger block in the directions indicated by the selected direction metric.

Moreover, in accordance with a preferred embodiment of the present invention, the selected metric is the maximal direction metric.

Furthermore, in accordance with a performed embodiment of the present invention, the step of moving adjusts the fingers of the finger block only if the selected direction metric is the maximal direction metric and exceeds a comparison direction metric by at least a predetermined threshold.

Additionally, in accordance with a preferred embodiment of the present invention, the method further includes the step of redefining finger blocks after the step of moving.

Moreover, in accordance with a preferred embodiment of the present invention, the finger block is formed of two fingers.

Furthermore, in accordance with a preferred embodiment of the present invention, the direction metrics are generated for five, six or nine different directions of joint movement.

Additionally, in accordance with a preferred embodiment of the present invention, the finger block is formed of two closely spaced fingers.

Moreover, in accordance with a preferred embodiment of the present invention, the closely spaced fingers are 7/8 chip apart.

Furthermore, in accordance with a preferred embodiment of the present invention, the finger block is formed of three fingers.

Additionally, in accordance with a preferred embodiment of the present invention, delays between fingers are set to be no smaller than 7/8 chip.

Moreover, in accordance with a preferred embodiment of the present invention, the step of generating includes the step of time averaging the direction metrics by summing consecutive direction metrics.

Furthermore, in accordance with a preferred embodiment of the present invention, the step of time averaging uses a forgetting factor.

Additionally, in accordance with a preferred embodiment of the present invention, the direction are based on power estimation.

There is also provided in accordance with a preferred embodiment of the present invention a method for deactivating a selected one of at least two fingers forming a finger block in a receiver. The method includes the steps of measuring powers of the fingers of the finger block, calculating crosscorrelations of the fingers of the finger block with one another, and deactivating the selected finger when a function of the powers and the crosscorrelations satisfies a predetermined criterion.

Moreover, in accordance with a preferred embodiment of the present invention, the finger block has two fingers.

Furthermore, in accordance with a preferred embodiment of the present invention, the function is $$\text{FingerCost} = \alpha \cdot \min(\text{PowerCenter}_1, \text{PowerCenter}_2) - \rho \cdot C$$

where $\alpha$ is a value between zero and one. $\text{PowerCenter}_1$ and $\text{PowerCenter}_2$ are powers of fingers in the finger block, C is a predetermined value and $\rho$ is one of the calculated crosscorrelations.

Additionally, in accordance with a preferred embodiment of the present invention, $\rho$ is $$\rho = \frac{\text{Re} \sum_{k=1}^{N} (ch_{Finger1}(k) \cdot ch^*_{Finger2}(k))}{\sum_{k=1}^{N} |(ch_{Finger1}(k) \cdot ch^*_{Finger2}(k))|} \text{ or}$$

$$\rho = \frac{\left| \sum_{k=1}^{N} ch_{Finger1}(k) \cdot ch^*_{Finger2}(k) \right|}{\sqrt{\sum_{k=1}^{N} |ch_{Finger1}(k)|^2 \cdot \sum_{k=1}^{n} |ch^*_{Finger2}(k)|^2}}.$$

Moreover, in accordance with a preferred embodiment of the present invention, the step of calculating uses a forgetting factor.

There is also provided in accordance with a preferred embodiment of the present invention $\alpha$ for assigning a new path to a finger candidate which is one of at least one inactive fingers in a receiver also having a plurality of active fingers. The method includes the steps of measuring the power of the new path, and calculating the crosscorrelation of the finger candidate and the one of the active fingers whose time delay is closest to the time delay of the finger candidate.

Moreover, in accordance with a preferred embodiment of the present invention, the method further includes the step of assigning the finger candidate to the new path when a composite finger power for the finger candidate satisfies a predetermined criterion.

Furthermore, in accordance with a preferred embodiment of the present invention, the step of calculating uses a crosscorrelation function defined as $$\rho = \frac{\text{Re} \sum_{k=1}^{N} (ch_{FingerCandidate}(k) \cdot ch^*_{ClosestFinger}(k))}{\sum_{k=1}^{N} |(ch_{FingerCandidate}(k) \cdot ch^*_{ClosestFinger}(k))|} \text{ or}$$

$$\rho = \frac{\left| \sum_{k=1}^{N} ch_{FingerCandidate}(k) \cdot ch^*_{ClosestFinger}(k) \right|}{\sqrt{\sum_{k=1}^{N} |ch_{FingerCandidate}(k)|^2 \cdot \sum_{k=1}^{n} |ch^*_{ClosestFinger}(k)|^2}}.$$

Additionally, in accordance with a preferred embodiment of the present invention, the step of calculating uses a forgetting factor.

There is also provided in accordance with a preferred embodiment of the present invention a method for reassigning a finger candidate which is one of a plurality of active fingers in a receiver to a new path. The method includes the steps of measuring the power of the new path, and calculating the crosscorrelation of the finger candidate and the one of the active fingers whose time delay is closest to the time delay of the finger candidate.

Moreover, in accordance with a preferred embodiment of the present invention, the method further includes the step of reassigning the finger candidate to the new path when a composite finger power for the finger candidate exceeds the minimum composite finger power of all the active fingers.

Furthermore, in accordance with a preferred embodiment of the present invention, the step of calculating uses a crosscorrelation function defined as $$\rho = \frac{\operatorname{Re} \sum_{k=1}^{N} (ch_{FingerCandidate}(k) \cdot ch^*_{ClosestFinger}(k))}{\sum_{k=1}^{N} |(ch_{FingerCandidate}(k) \cdot ch^*_{ClosestFinger}(k))|} \text{ or}$$

$$\rho = \frac{\left|\sum_{k=1}^{N} ch_{FingerCandidate}(k) \cdot ch^*_{ClosestFinger}(k)\right|}{\sqrt{\sum_{k=1}^{N} |ch_{FingerCandidate}(k)|^2 \cdot \sum_{k=1}^{n} |ch^*_{ClosestFinger}(k)|^2}}.$$

Additionally, in accordance with a preferred embodiment of the present invention, the step of calculating uses a forgetting factor.

There is also provided in accordance with a preferred embodiment of the present invention a receiver having at least two fingers forming a finger block, the finger block tracking at least one path of a multipath channel. The receiver includes a direction metric determiner, a metric selector and a finger adjuster. The direction metric determiner generates direction metrics of each of a set of possible directions of joint movement of the fingers of the finger block. The metric selector selects one of the direction metrics according to a predetermined criterion. The finger adjuster moves the fingers of the finger block in the directions indicated by the selected direction metric.

Moreover, in accordance with a preferred embodiment of the present invention, the selected direction metric is the maximal direction metric.

Furthermore, in accordance with a preferred embodiment of the present invention, the finger adjuster moves the fingers of the finger block only if the selected direction metric is the maximal direction metric and exceeds a comparison direction metric by at least a predetermined threshold.

Additionally, in accordance with a preferred embodiment of the present invention, the finger adjuster includes a redefiner which redefines finger blocks once the fingers have been moved.

Moreover, in accordance with a preferred embodiment of the present invention, the finger block is formed of two fingers.

Furthermore, in accordance with a preferred embodiment of the present invention, the determiner generates the direction metrics for five, six or nine different directions of joint movement.

Additionally, in accordance with a preferred embodiment of the present invention, the finger block is formed of two closely spaced fingers.

Moreover, in accordance with a preferred embodiment of the present invention, the closely spaced fingers are ⅞ chip apart.

Furthermore, in accordance with a preferred embodiment of the present invention, the finger block is formed of three fingers.

Additionally, in accordance with a preferred embodiment of the present invention, delays between fingers are set to be no smaller than ⅞ chip.

Moreover, in accordance with a preferred embodiment of the present invention, the direction metrics are based on power estimation.

There is also provided in accordance with a preferred embodiment of the present invention a finger deactivator for deactivating a selected one of at least two fingers which form a finger block in a receiver. The finger deactivator includes a finger power measurement unit for measuring the powers of the fingers of the finger block, a correlation calculator for calculating the crosscorrelations of the fingers of the finger block with one another, and a deactivation unit for deactivating the selected finger when a function of the powers and the crosscorrelations satisfies a predetermined criterion.

Moreover, in accordance with a preferred embodiment of the present invention, the finger block has two fingers and the function is $$\text{FingerCost} = \alpha \cdot \min(\text{PowerCenter}_1, \text{PowerCenter}_2) - \rho \cdot C$$

where $\alpha$ is a value between zero and one, $\text{PowerCenter}_1$ and $\text{PowerCenter}_2$ are powers of fingers in the finger block, $C$ is a predetermined value and $\rho$ is one of the calculated crosscorrelations.

Furthermore, in accordance with a preferred embodiment of the present invention, $\rho$ is $$\rho = \frac{\operatorname{Re} \sum_{k=1}^{N} (ch_{Finger1}(k) \cdot ch^*_{Finger2}(k))}{\sum_{k=1}^{N} |(ch_{Finger1}(k) \cdot ch^*_{Finger2}(k))|} \text{ or}$$

$$\rho = \frac{\left|\sum_{k=1}^{N} ch_{Finger1}(k) \cdot ch^*_{Finger2}(k)\right|}{\sqrt{\sum_{k=1}^{N} |ch_{Finger1}(k)|^2 \cdot \sum_{k=1}^{n} |ch^*_{Finger2}(k)|^2}}.$$

Additionally, in accordance with a preferred embodiment of the present invention, the correlation calculator uses a forgetting factor.

There is also provided in accordance with a preferred embodiment of the present invention a finger assignor in a receiver having a plurality of active fingers and at least one inactive finger. The finger assignor is operative to assign a finger candidate which is one of the at least one inactive finger to a new path. The finger assignor includes a power measurement unit for measuring the power of the new path, and a correlation calculator for calculating the crosscorrelation of the finger candidate and the one of the active fingers whose time delay is closest to the time delay of the finger candidate.

Moreover, in accordance with a preferred embodiment of the present invention, the finger assignor further including an assignment unit for assigning the finger candidate to the new path when a composite finger power for the finger candidate satisfies a predetermined criterion.

Furthermore, in accordance with a preferred embodiment of the present invention, the correlation calculator uses a crosscorrelation function defined as $$\rho = \frac{\operatorname{Re} \sum_{k=1}^{N} (ch_{FingerCandidate}(k) \cdot ch^*_{ClosestFinger}(k))}{\sum_{k=1}^{N} |(ch_{FingerCandidate}(k) \cdot ch^*_{ClosestFinger}(k))|} \text{ or}$$

-continued $$\rho = \frac{\left|\sum_{k=1}^{N} ch_{FingerCandidate}(k) \cdot ch^*_{ClosestFinger}(k)\right|}{\sqrt{\sum_{k=1}^{N} |ch_{FingerCandidate}(k)|^2 \cdot \sum_{k=1}^{n} |ch^*_{ClosestFinger}(k)|^2}}.$$

Additionally, in accordance with a preferred embodiment of the present invention, the correlation calculator uses a forgetting factor.

There is also provided in accordance with a preferred embodiment of the present invention a finger assignor in a receiver having a plurality of active fingers. The finger assignor is operative to assign a finger candidate which is one of the active fingers to a new path. The finger assignor includes a power measurement unit for measuring the power of the new path, and a correlation calculator for calculating the crosscorrelation of the finger candidate and the one of the active fingers whose time delay is closest to the time delay of the finger candidate.

Moreover, in accordance with a preferred embodiment of the present invention, the finger assignor further including an assignment unit for reassigning the finger candidate to the new path when a composite finger power for the finger candidate exceeds the minimum composite finger power of all the active fingers.

Furthermore, in accordance with a preferred embodiment of the present invention, the correlation calculator uses a crosscorrelation function defined as $$\rho = \frac{\text{Re} \sum_{k=1}^{N} (ch_{FingerCandidate}(k) \cdot ch^*_{ClosestFinger}(k))}{\sum_{k=1}^{N} |(ch_{FingerCandidate}(k) \cdot ch^*_{ClosestFinger}(k))|} \text{ or}$$

$$\rho = \frac{\left|\sum_{k=1}^{N} ch_{FingerCandidate}(k) \cdot ch^*_{ClosestFinger}(k)\right|}{\sqrt{\sum_{k=1}^{N} |ch_{FingerCandidate}(k)|^2 \cdot \sum_{k=1}^{n} |ch^*_{ClosestFinger}(k)|^2}}.$$

Additionally, in accordance with a preferred embodiment of the present invention, the correlation calculator uses a forgetting factor.

There is also provided in accordance with a preferred embodiment of the present invention a method used in a receiver having at least two fingers, the fingers tracking at least one path of a multipath channel. The method includes the steps of forming a finger block of at least two of the at least two fingers, and jointly tracking the fingers of the finger block.

Moreover, in accordance with a preferred embodiment of the present invention, the step of jointly tracking includes the steps of generating direction metrics of each of a set of possible directions of joint movement of the fingers of the finger block, selecting one of the direction metrics according to a predetermined criterion, and moving the fingers of the finger block in the directions indicated by the selected direction metric.

BRIEF DESCRIPTION OF THE DRAWINGS

The present invention will be understood and appreciated more fully from the following detailed description taken in conjunction with the appended drawings in which:

FIGS. 2A–2C are schematic illustrations of the twenty-seven possible joint movements of three fingers;

FIG. 4 is a schematic illustration of six possible joint movements, useful when considering only closely spaced fingers;

DETAILED DESCRIPTION OF THE PRESENT INVENTION

Figure 1:
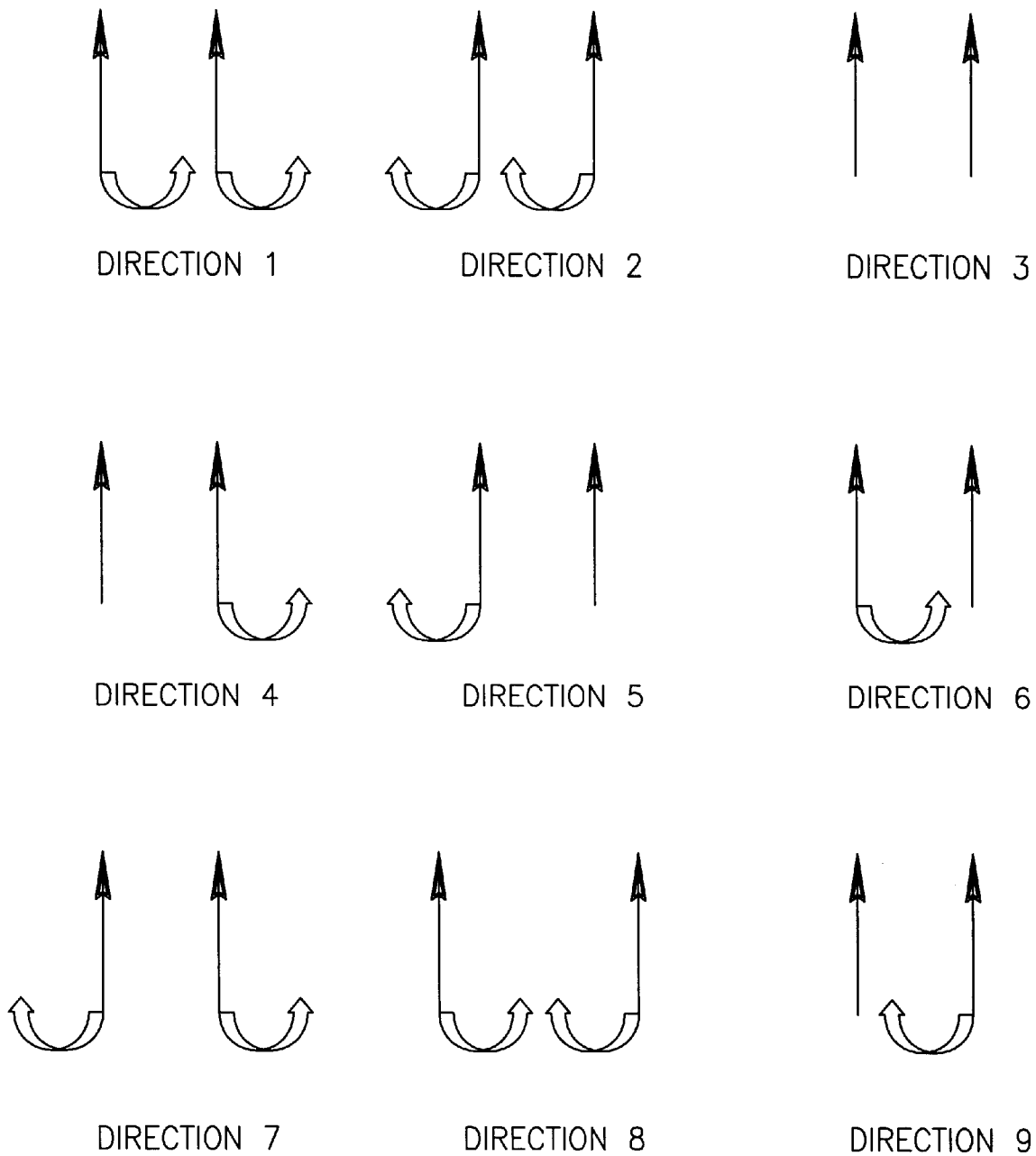
FIG. 1 is a schematic illustration of the nine possible joint movements of two fingers.

The present invention jointly tracks the timing of multiple paths or multiple path clusters. Any group of fingers, which jointly track multiple paths, is herein called a "finger block". Finger blocks are especially useful for fingers that track paths which are "close" to their neighbors, but can also be used for paths which are not particularly close.

The definition of "close path" can be any desired definition but typically it defines paths which interfere with one another. For example, two close paths might be those whose time separation is less than 1.5 Tc, where Tc is the chip duration. "Close fingers" of a finger block are those which are within a certain predefined range RANGE of delays of its neighbors in the block, such as between one chip and half a chip. Thus, for a finger block of two fingers, finger 1 and finger 2 are within RANGE of each other. For a finger block of four fingers, where the fingers are ordered by their sampling point as finger 1, finger 2, finger 3 and finger 4, there is a delay within RANGE between neighboring fingers (finger 1 to finger 2, finger 2 to finger 3 and finger 3 to finger 4).

FIG. 1, to which reference is now made, illustrates the possibilities to consider for a finger block having two fingers, where each finger is shown with an arrow. Since the paths being tracked move about in time, the receiver must determine how the paths have moved in order to move their associated fingers.

As shown in FIG. 1, the possible nine movements are: both become later (direction 1), both become earlier (direction 2), both stay the same (direction 3), the second becomes later (direction 4) or earlier (direction 9), the first becomes later (direction 6) or earlier (direction 5), and both move towards each other (direction 8) or away from each other (direction 7).

Figure 2A:
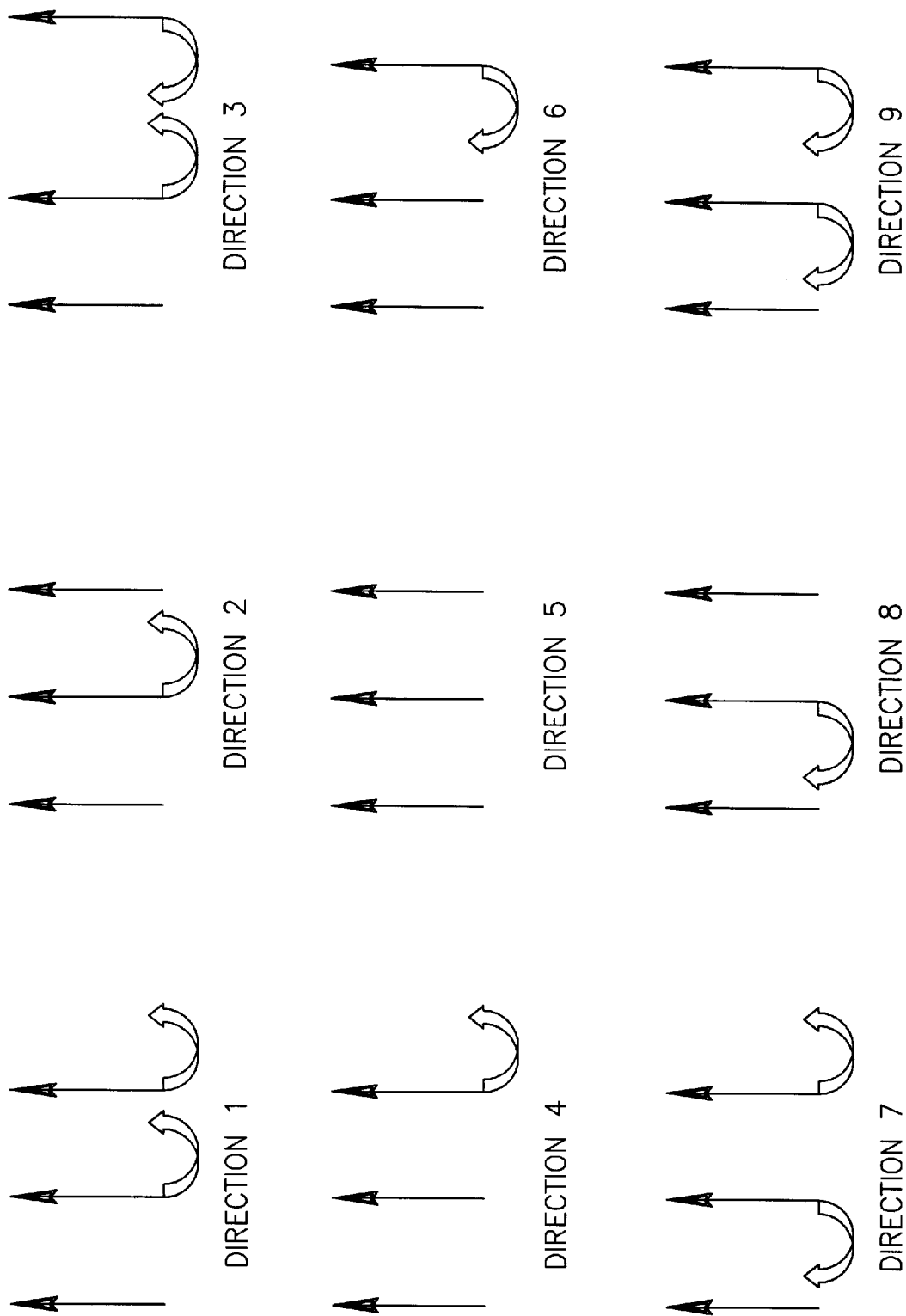
Figure 2C:
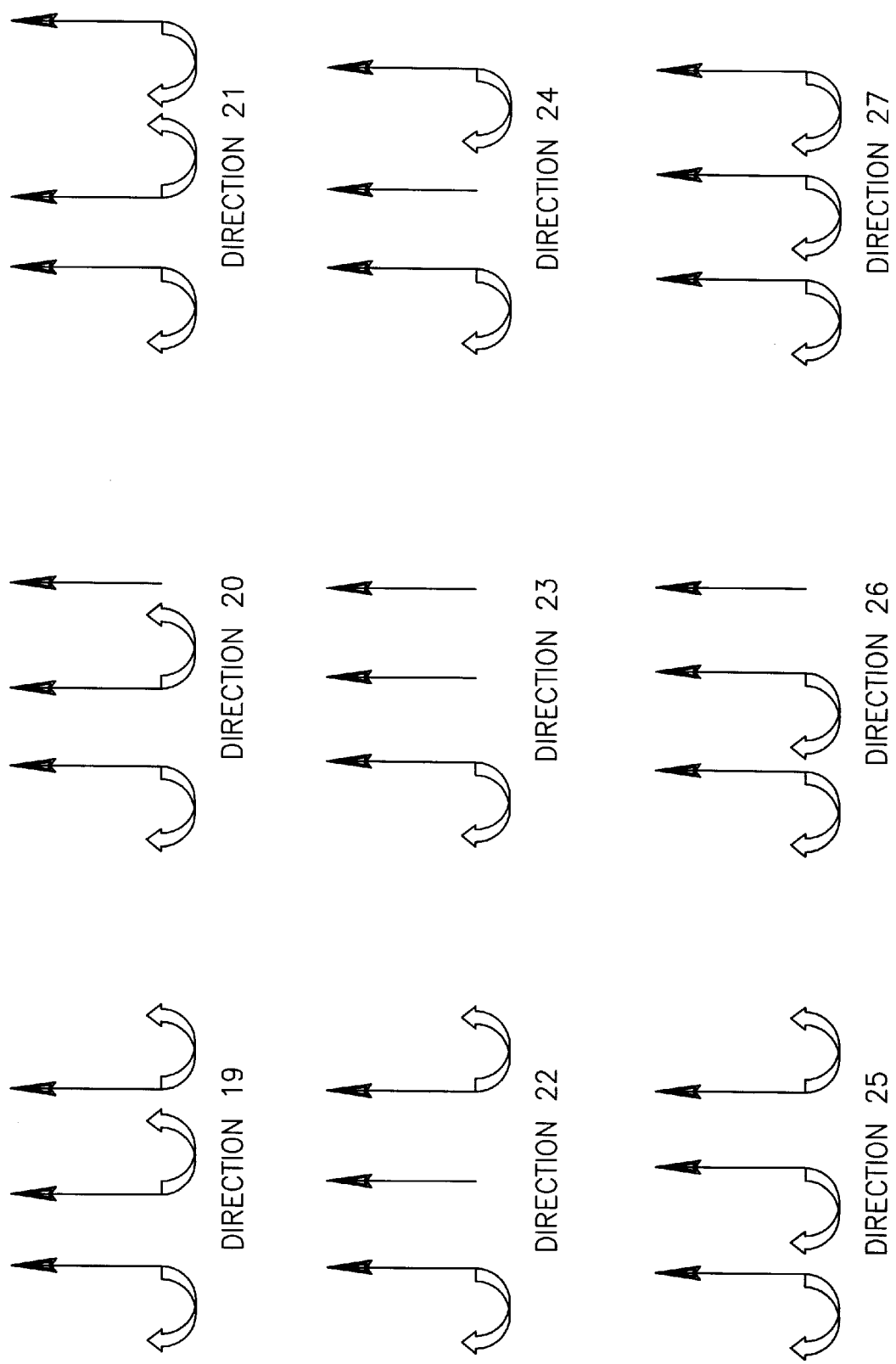

FIGS. 2A–2C, to which reference is now briefly made, illustrate the possibilities for a finger block of three fingers. There are 27 possible finger movements, all of which can be separately considered when performing a joint tracking operation. FIGS. 2A–2C are believed to be self-explanatory considering the previous discussion and therefore, will not be further described.

To measure the possible movements, each finger is examined at its nominal (or center) sampling time and at plus or minus one or more fixed delays. The delays define "directions" of possible movement from the center sampling time. For example, a single delay, which might be of Tc/4, creates three directions of movement, "center", "early" and "late". The delayed signals are used to determine which of the possible movements actually occurred and to move the sampling point accordingly.

In the present invention, direction metrics are assigned to each of the possible movement directions, using measurements of the delayed versions of the data of the fingers of the finger block, and a decision tree is provided to determine from the direction metrics which movement occurred. Typically, the fingers are delayed slightly early and slightly late, therefore each finger should be examined early, late and center (i.e. no delay). However, other types and amounts of delays are possible and are incorporated into the present invention.

Figure 3:
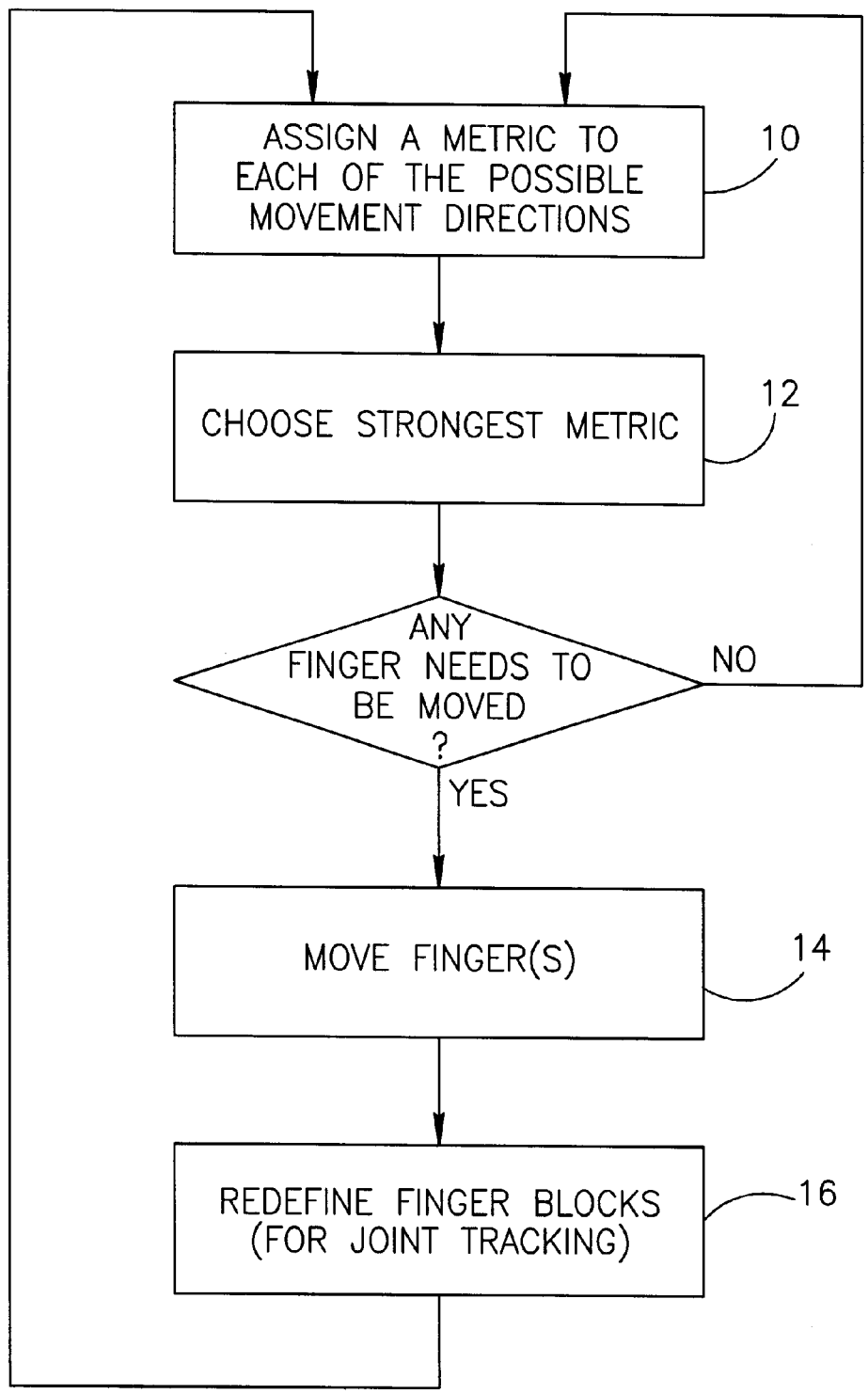
FIG. 3 is a flow chart illustration of a general method of jointly time tracking multiple paths, constructed and operative in accordance with a preferred embodiment of the present invention.

FIG. 3, to which reference is now made, is a flow chart illustration of the present invention. Initially, in step 10, a metric is assigned to each of the possible joint movement directions. In step 12 the direction with the strongest metric is chosen. If no finger movement is required (as in for example direction 3 of FIG. 1), then once again steps 10 and 12 are performed. If a finger movement is required, (e.g. all directions of FIG. 1 excluding direction 3), then each finger needs to be moved is moved to its new location in step 14. Finally, in step 16, a redefinition of the finger blocks occurs whenever the finger movement of step 14 causes new fingers to become within RANGE of each other, or when closely spaced fingers are separated and are not longer within RANGE of each other.

In one preferred embodiment step 10 is performed by assigning power-based metrics to each of the possible joint direction metrics. In accordance with FIG. 1, the direction metrics are assigned to each of the 9 possible joint directions:

$$\begin{cases} \text{Direction}_1\_\text{metric} = \text{PowerLate}_1 + \text{PowerLate}_2 \\ \text{Direction}_2\_\text{metric} = \text{PowerEarly}_1 + \text{PowerEarly}_2 \\ \text{Direction}_3\_\text{metric} = \text{PowerCenter}_1 + \text{PowerCenter}_2 \\ \text{Direction}_4\_\text{metric} = \text{PowerCenter}_1 + \text{PowerLate}_2 \\ \text{Direction}_5\_\text{metric} = \text{PowerEarly}_1 + \text{PowerCenter}_2 \\ \text{Direction}_6\_\text{metric} = \text{PowerLate}_1 + \text{PowerCenter}_2 \\ \text{Direction}_7\_\text{metric} = \text{PowerEarly}_1 + \text{PowerLate}_2 \\ \text{Direction}_8\_\text{metric} = \text{PowerLate}_1 + \text{PowerEarly}_2 \\ \text{Direction}_9\_\text{metric} = \text{PowerCenter}_1 + \text{PowerEarly}_2 \end{cases}$$

where $\text{PowerEarly}_i$, $\text{PowerCenter}_i$ and $\text{PowerLate}_i$ are estimated early, center and late power of $\text{finger}_1$ respectively.

In another preferred embodiment, directions 6, 8 and 9 can be limited, so that if the delay between the fingers is less than a pre-specified threshold (e.g. 7/8 Tc), then the corresponding direction metric is zeroed. This ensures that those directions are not chosen in step 12 and prevents the situation where the fingers become too closely spaced.

Similarly, in a 3-finger block, direction metrics are assigned to all possible 27 joint movement directions in accordance with FIGS. 2A–2C.

In another preferred embodiment, time averaging with or without forgetting factors (known in the art) can be applied to each of the direction metrics in order to reduce their statistical variability. In one preferred embodiment Equations (1) are replaced by:

$$\begin{cases} \text{Smoothed}\_L_1\_L_2 = (1-\alpha)\text{Smoothed}\_L_1\_L_2 + \\ \quad \alpha[\text{PowerLate}_1 + \text{PowerLate}_2] \\ \text{Smoothed}\_E_1\_E_2 = (1-\alpha)\text{Smoothed}\_E_1\_E_2 + \\ \quad \alpha[\text{PowerEarly}_1 + \text{PowerEarly}_2] \\ \text{Smoothed}\_C_1\_C_2 = (1-\alpha)\text{Smoothed}\_C_1\_C_2 + \\ \quad \alpha[\text{PowerCenter}_1 + \text{PowerCenter}_2] \\ \text{Smoothed}\_C_1\_L_2 = (1-\alpha)\text{Smoothed}\_C_1\_L_2 + \\ \quad \alpha[\text{PowerCenter}_1 + \text{PowerLate}_2] \\ \text{Smoothed } E_1\_C_2 = (1-\alpha)\text{Smoothed}\_E_1\_C_2 + \\ \quad \alpha[\text{PowerEarly}_1 + \text{PowerCenter}_2] \\ \text{Smoothed}\_L_1\_C_2 = (1-\alpha)\text{Smoothed}\_L_1\_C_2 + \\ \quad \alpha[\text{PowerLate}_1 + \text{Power}\_\text{Center}_2] \\ \text{Smoothed}\_E_1\_L_2 = (1-\alpha)\text{Smoothed}\_E_1\_L_2 + \\ \quad \alpha[\text{PowerEarly}_1 + \text{PowerLate}_2] \\ \text{Smoothed}\_L_1\_E_2 = (1-\alpha)\text{Smoothed}\_L_1\_E_2 + \\ \quad \alpha[\text{PowerLate}_1 + \text{PowerEarly}_2] \\ \text{Smoothed}\_C_1\_E_2 = (1-\alpha)\text{Smoothed}\_C_1\_E_2 + \\ \quad \alpha[\text{PowerCenter}_1 + \text{PowerEarly}_2] \end{cases} \quad (2A)$$

$$\begin{cases} \text{Direction}_1\_\text{Metric} = \text{Smoothed } L_1\_L_2 \\ \text{Direction}_2\_\text{Metric} = \text{Smoothed}\_E_1\_E_2 \\ \text{Direction}_3\_\text{Metric} = \text{Smoothed } C_1\_C_2 \\ \text{Direction}_4\_\text{Metric} = \text{Smoothed}\_C_1\_L_2 \\ \text{Direction}_5\_\text{Metric} = \text{Smoothed}\_E_1\_C_2 \\ \text{Direction}_6\_\text{Metric} = \text{Smoothed}\_L_1\_C_2 \\ \text{Direction}_7\_\text{Metric} = \text{Smoothed}\_E_1\_L_2 \\ \text{Direction}_8\_\text{Metric} = \text{Smoothed}\_L_2\_E_2 \\ \text{Direction}_9 \text{ Metric} = \text{Smoothed}\_C_1\_E_2 \end{cases} \quad (2B)$$

where $\alpha \in [0,1]$ is the forgetting factor.

Furthermore, in accordance with a preferred embodiment of the present invention, the step of assigning metrics to all possible directions can also include a comparison of the strongest metric in Equations (1) or Equations (2B) to the second strongest metric or some other metric. If the difference is smaller than a certain pre-specified threshold "Metric_Threshold", $\text{Direction}_3\_\text{Metric}$ is assigned a large value. This ensures that in such a case, $\text{Direction}_3\_\text{Metric}$ is chosen in step 12 and no finger movement occurs (see FIG. 1). Thus, finger movement occurs only when the strongest direction metric is larger than the compared metric by more than Metric_Threshold.

In another preferred embodiment, after a finger movement occurs in step 14, all smoothed direction metrics in Equations (2A) are zeroed, so as to abandon all measurements related to the previous finger locations.

It will be apparent to someone skilled in the art that various other direction metrics can be assigned based on the channel tap estimator, reception quality and their combination with finger power measurements.

When one or more fingers are moved in step 14, the relationships of all the fingers being tracked change. It is possible that a finger is now sufficiently far away to no longer be part of the block, or, alternatively, that a finger previously not of the block is now close to one of the fingers of the block and, thus, must be included in the block. These considerations are performed in step 16 and the finger block(s) are redefined, if necessary.

The present invention can be implemented, for any number of fingers in a finger block and for any definition of a finger block. One exemplary definition is that a finger block has two fingers, and RANGE accepts the single value RANGE=⅞ Tc. Thus, the two fingers in the finger block are exactly ⅞ Tc apart and are not allowed to become closer. Therefore, directions 6, 8 and 9 are discarded. This reduces the number of possible movements from nine to six, as shown in FIG. 4, to which reference is now made. The two fingers can become late (direction1), become early (direction2), or stay at the correct sampling time (direction3). These three movements do not alter the timing relationship between the fingers in the block. The three other movement directions cause a finger block to separate, are considered where the later finger becomes later (direction4), the earlier finger becomes earlier (direction5) or the earlier finger becomes earlier and the later finger becomes later (direction7).

According to a preferred embodiment of the present invention, the number of possible movements can be further reduced to five, where the five directions are directions 1–5 of FIG. 4.

Figure 5:
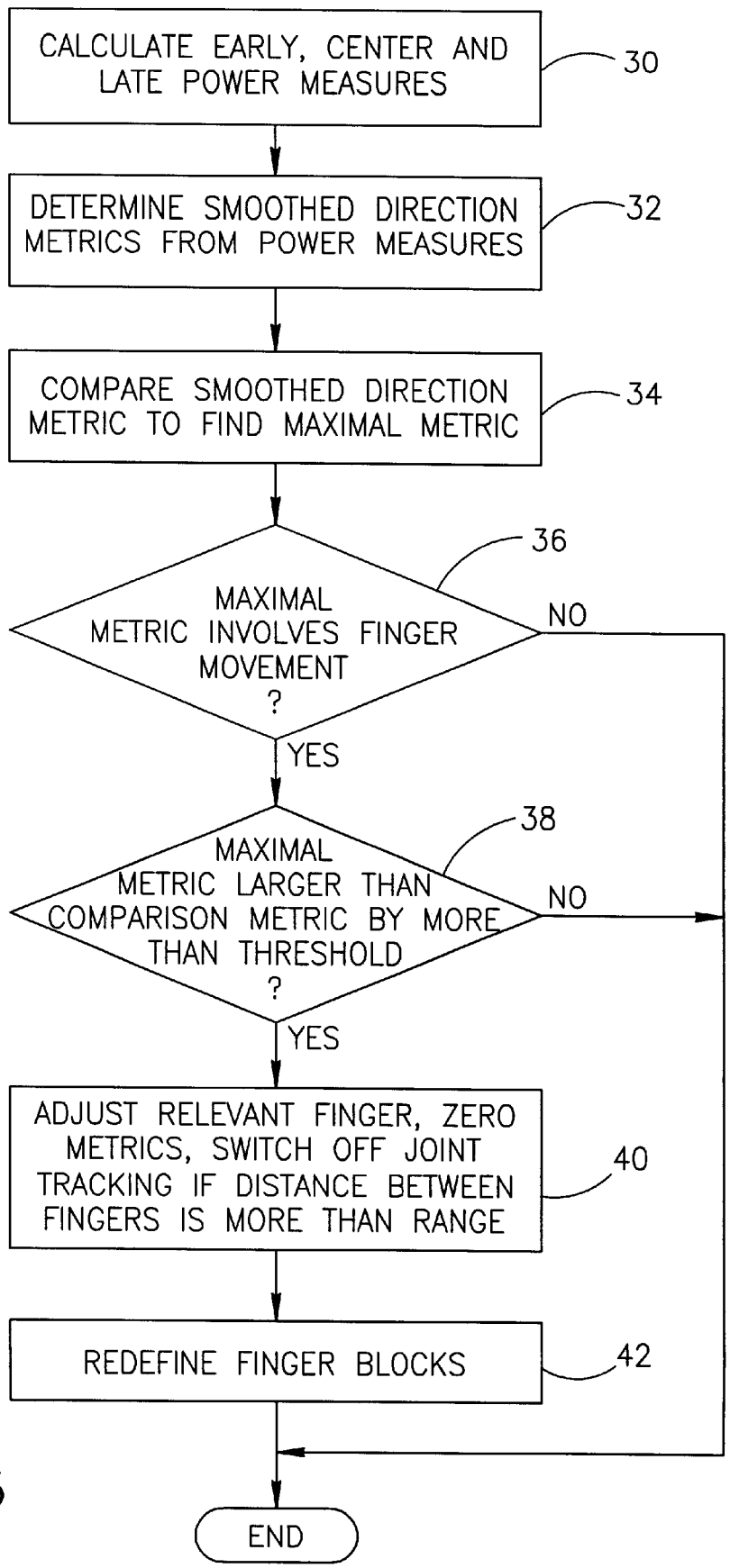
FIG. 5 is a flow chart illustration of the operation of a finger block of two fingers, constructed and operative in accordance with a further preferred embodiment of the present invention, and considering the joint movements of FIG. 4.

FIG. 5 illustrates a joint tracking method for a finger block of two fingers using the movements shown in FIG. 4. FIG. 5 is a special case of the general flow chart of FIG. 3. Only those fingers which are close to each other, are jointly tracked. The other fingers are individually tracked by conventional methods. The individual tracking will not be discussed herein as it is well known in the art.

In step 30, the early, late and central power measures PowerEarly$_i$, PowerLate$_i$, and PowerCenter$_i$, respectively, of each finger are derived (i is a number of finger).

In step 32, the direction metrics related to the six possible movements of FIG. 4, are determined in accordance with Eqs. 2A and 2B. The direction metrics are formed from the relevant combinations of the pairs of the individual early, late and central powers. The pairs are: both early (PowerEarly$_1$, PowerEarly$_2$), both late (PowerLate$_1$, PowerLate$_2$), both central (PowerCenter$_1$, PowerCenter$_2$), early-central (PowerEarly$_1$, PowerCenter$_2$), central-late (PowerCenter$_1$, PowerLate$_2$) and early-late (PowerEarly$_1$, PowerLate$_2$), and the calculations are as follows:

Smoothed_$E_1$_$K_2$=(1−α)Smoothed_$E_1E_2$+u(PowerEarly$_1$+PowerEarly$_2$)

Smoothed_$L_1$_$L_2$=(1−α)Smoothed_$L_1$_$L_2$+α(PowerLate$_1$+Power Late$_2$)

Smoothed $E_1C_3$=(1−α)Smoothed_$E_1$_$C_2$+α(PowerEarly$_1$+PowerCenter$_2$)

Smoothed_$C_1$_$L_2$=(1—α)Smoothed_$C_1L_2$+α(PowerCenter$_1$+PowerLate$_2$)

Smoothed_$C_1$_$C_2$=(1—α)Smoothed_$C_1$_$C_2$+α(PowerCenter$_1$+PowerCenter$_2$)

Smoothed_$E_1$_$L_2$=(1—α)Smoothed_$E_1$_$L_3$+α(PowerEarly$_1$+PowerLate$_2$)     (3)

In step 34, the largest direction metric is selected, and in step 36, it is checked whether the maximal direction metric involves finger movement. If the maximal direction metric is the central metric Smoothed_$C_1$_$C_2$, no finger is moved. Otherwise, in step 38, it is checked whether the maximal metric is larger than another metric by more than a predetermined threshold, for example the value 16. If the maximal metric is sufficiently large, then in step 40 the relevant fingers are adjusted, the metrics are zeroed, and joint tracking is switched off if the distance between the fingers is more than RANGE. Finally, the finger blocks are redefined (step 42).

The threshold check of step 38 compares the maximal metric with another metric. If the maximal metric is the double early metric Smoothed_$E_1$_$E_2$, indicating that both fingers have become earlier (direction 2 of FIG. 4), then it is compared to the double late metric Smoothed_$L_1$_$L_2$. If the difference Smoothed_$E_1$_$E_2$–Smoothed_$L_1$_$L_2$ is greater than the threshold, the finger adjustment of step 40 is the advancement of both finger_1 and finger_2. Since the fingers were moved, new finger blocks are defined based on the new delay of the fingers.

If the maximal metric is the double late metric Smoothed_$L_1$_$L_2$, indicating that both fingers have become later (direction 1 of FIG. 4), then it is compared to the double early metric Smoothed_$E_1$_$E_2$. If the difference Smoothed_$L_1$_$L_3$–Smoothed_$E_1$_$E_2$ is greater than the threshold, the finger adjustment of step 40 is the delay of both finger_1 and finger_2. Since the fingers were moved, new finger blocks are defined based on the new delay of the fingers.

If the maximal metric is the mixed metric Smoothed_$E_1$_$C_2$, indicating that the first finger has become earlier (direction 5 of FIG. 4), then it is compared to the central metric Smoothed_$C_1$_$C_2$. If the difference Smoothed_$E_1$_$C_2$–Smoothed_$C_1$_$C_2$ is greater than the threshold, the finger adjustment of step 40 is the advancement of finger_1. Since finger_1 moved away, the two fingers are now sufficiently separate and the joint tracking is now switched off. Since the fingers were moved, new finger blocks are defined based on the new delay of the fingers.

Similarly, if the maximal metric is the mixed metric Smoothed_$C_1$_$L_2$, indicating that the second finger has become later (direction 4 of FIG. 4), then it is compared to the central metric Smoothed_$C_1$_$C_2$. If the difference Smoothed_$C_1$_$L_2$–Smoothed_$C_1$_$C_2$ is greater than the threshold, the finger adjustment of step 40 is the delay of finger_2. Since finger_2 moved away, the two fingers are now sufficiently separate and the joint tracking is now switched off. Since the fingers were moved, new finger blocks are defined based on the new delay of the fingers.

If the maximal metric is the mixed metric Smoothed_$E_1$_$L_2$, indicating that the first finger has become earlier and the second finger has become later (direction 7 of FIG. 4), then it is compared to the central metric Smoothed_$C_1$_$C_2$. If the difference Smoothed_$E_1$_$L_2$–Smoothed_$C_1$_$C_2$ is greater than the threshold, the finger adjustment of step 40 is the advancement of finger_1 and the delay of finger_2. Since the fingers have moved apart, the two fingers are now sufficiently separate and the joint tracking is now switched off. Since the fingers were moved, new finger blocks are defined based on the new delay of the fingers.

Figure 6:
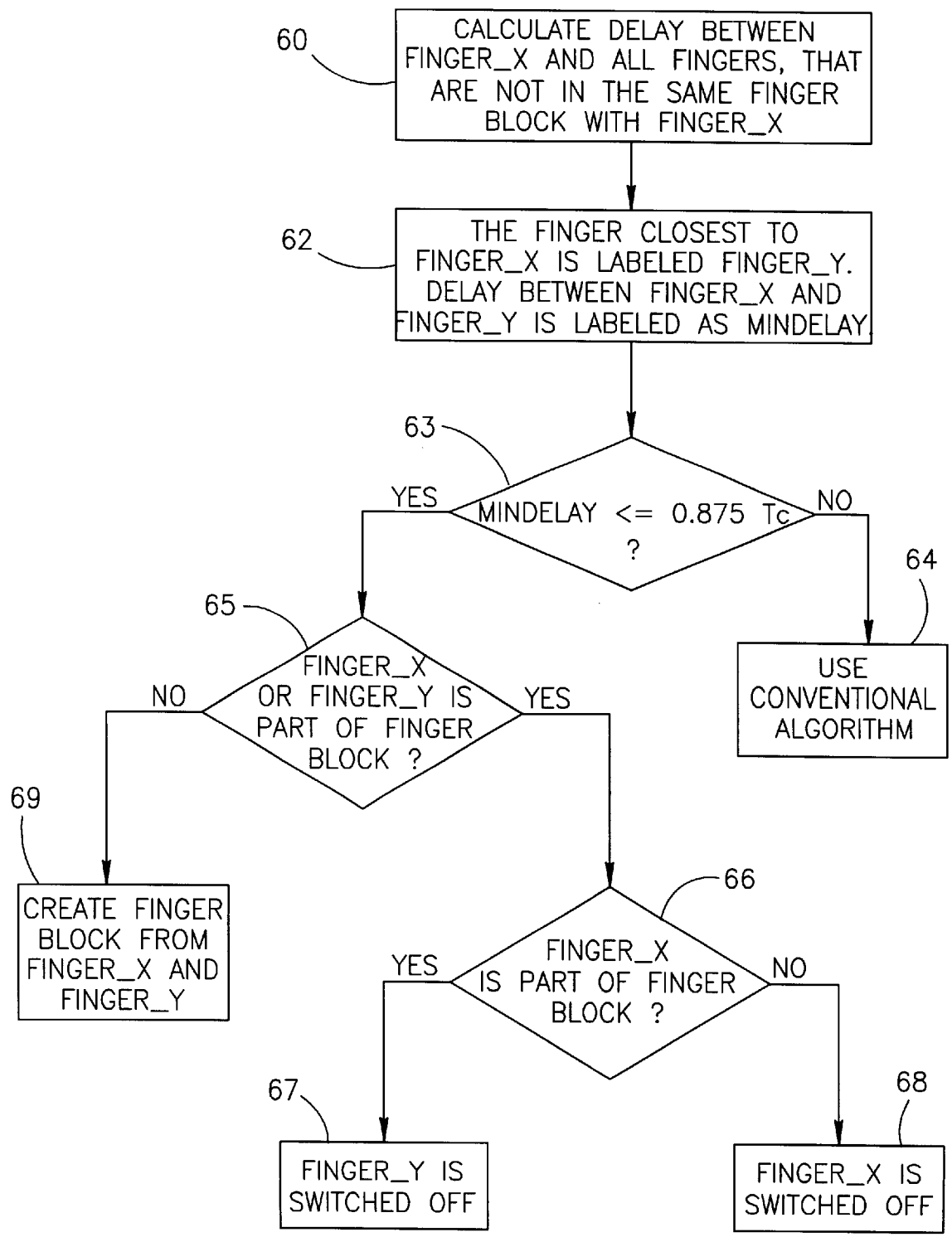
FIG. 6 is a flow chart illustration of a method of redefining finger blocks forming part of the method of FIG. 5.

Reference is now made to FIG. 6 which details the operations of step 42 (redefine finger blocks). Each finger FINGER_X which has been moved is reviewed to consider whether or not it is now close to other fingers. In step 60, the delays between FINGER_X and all the other fingers not in the same finger block with FINGER_X are determined, and, in step 62, the finger closest to FINGER_X is labeled FINGER Y. The delay between FINGER_X and FINGER_Y is labeled MinDelay.

The delay MinDelay is then compared (step 63) to a minimum allowed threshold delay, for example ⅞ Tc. If the delay MinDelay is larger than the threshold level, then the finger is sufficiently far from the other fingers to be individually tracked. Thus, conventional early-late time tracking will be performed (step 64) on it. Otherwise, FINGER_X and FINGER_Y are too close to each other and either one of them has to be removed or they both must be tracked as part of a finger block.

In step 65 FINGER_X and FINGER_Y are checked to see if they are part of a finger block. If FINGER_X and FINGER_Y are not part of a finger block, a finger block is created (step 69) from FINGER_X and FINGER_Y. Otherwise, in step 66, FINGER X is checked to see if it is part of a finger block. If FINGER_X is part of the block, FINGER_Y is switched off (i.e. it is no longer used as a finger) in step 67. Otherwise, FINGER_X is switched off in step 68. It will be appreciated that if the switched off finger is part of a block having a pair of fingers, joint tracking is also switched off.

Figure 7:
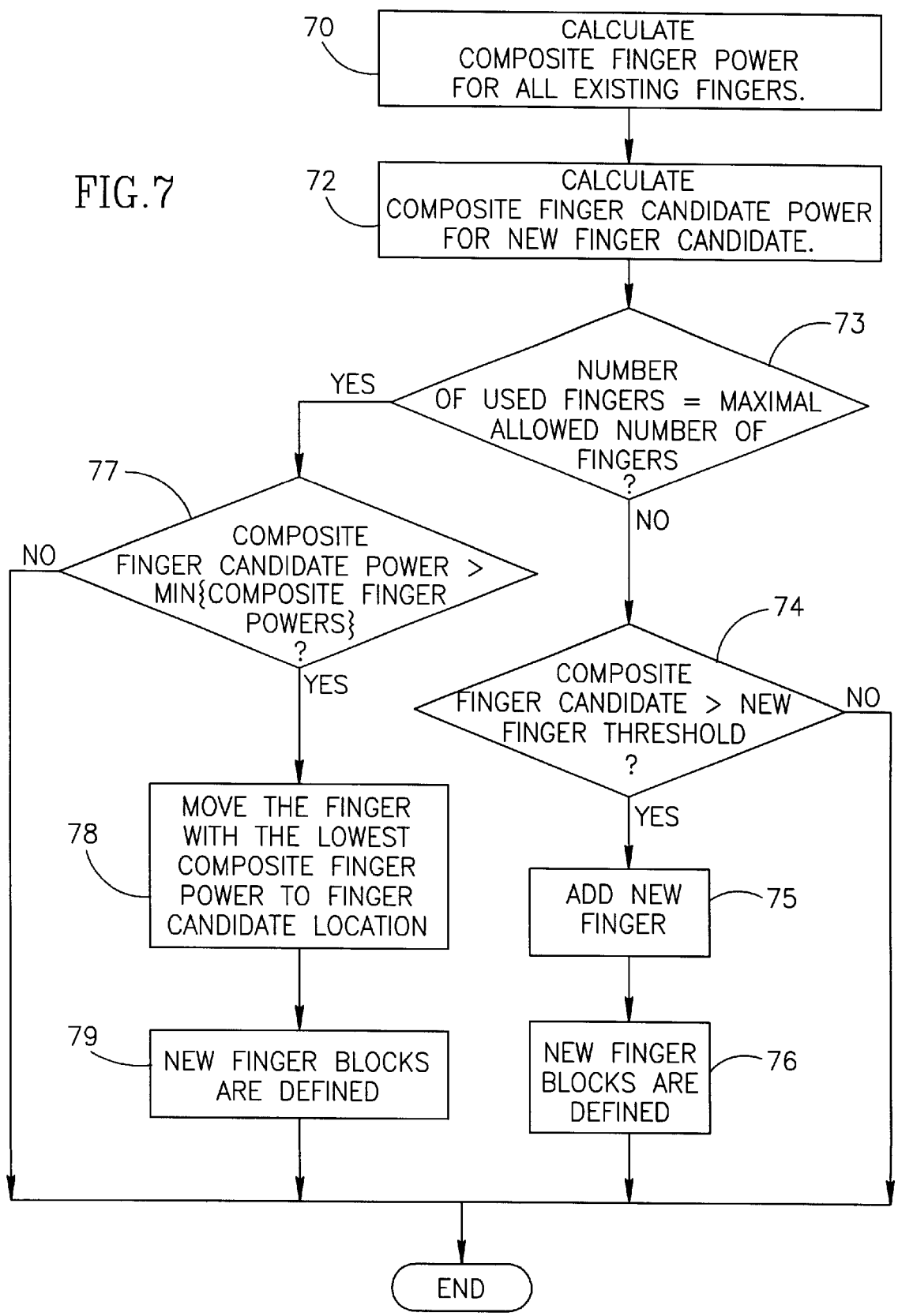
FIG. 7 is a flow chart illustration of a method of finger addition and finger replacing mechanism useful in a rake receiver performing the joint tracking method of FIG. 3.
Figure 8:
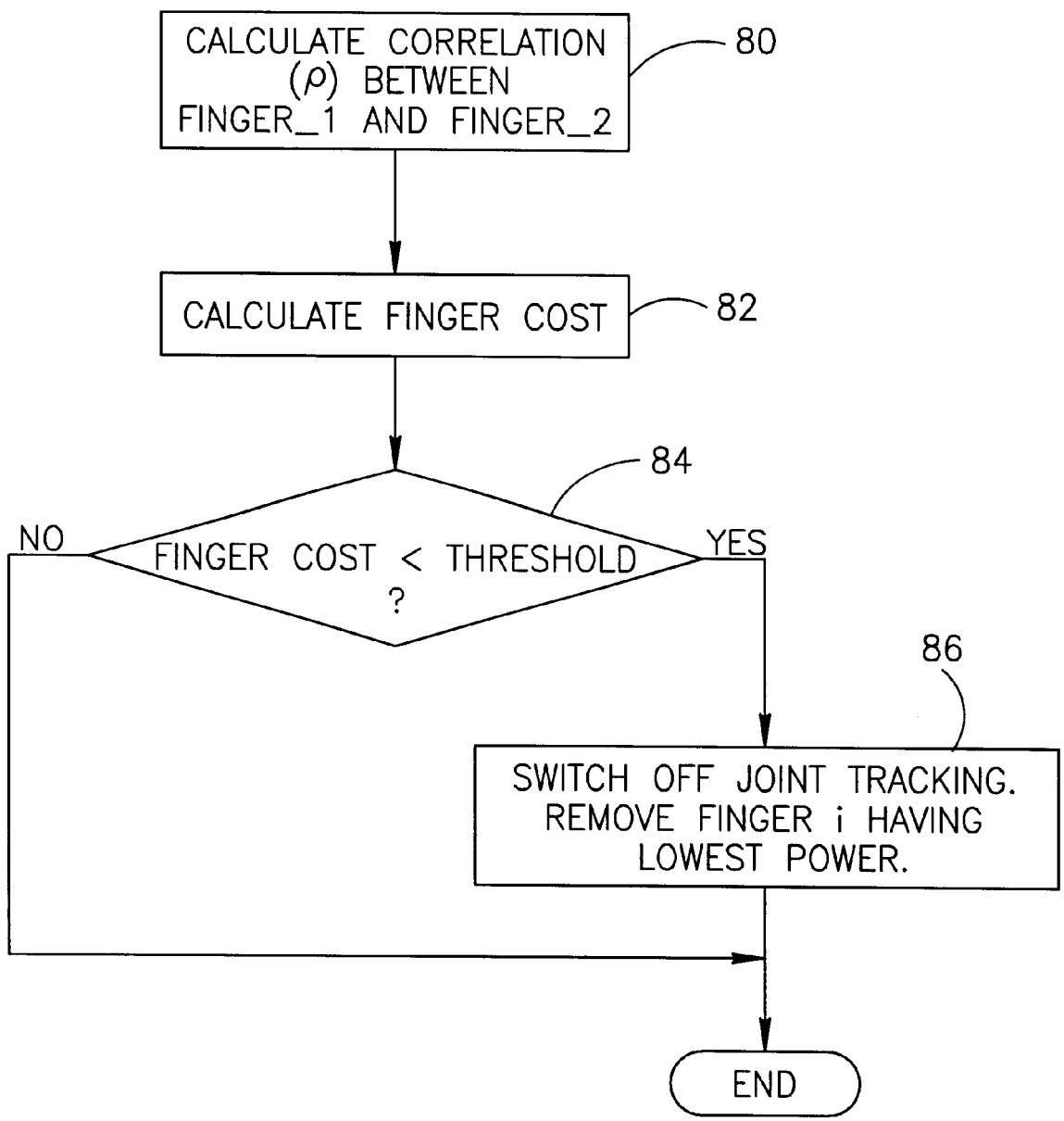
FIG. 8 is a flow chart illustration of a method of switching off joint tracking, useful in a rake receiver performing the joint tracking method of FIG. 5.

It will be appreciated that the presence of a finger block affects various other elements of the receiver, all of which must be slightly modified to include operation with finger blocks. FIGS. 7 and 8, to which reference is now made, illustrate these modified operations for close path detection, finger replacement and finger removal.

Reference is now made to FIG. 7 which details the method in which it is decided whether a new path candidate should be added to the rake as a new finger. The method for generating new path candidates is known in the art and is therefore not described. In step 70 CompositeFingerPower is computed for all active rake fingers, where $$\text{CompositeFingerPower} = F(\text{PowerCenter}_i, \rho, \Lambda)$$

and $\rho$ is the cross-correlation between the finger and its closest neighbor in the rake receiver or between the finger to the new finger candidate. If it is closer than all other rake fingers, $\Lambda$ is the delay to the closest finger, i is the finger number, and $F(\bullet,\bullet,\bullet)$ is an arbitary function. For example, if $\Lambda \geq T_c$ $F(\text{PowerCenter}_i, \rho, \Lambda)$ can be set equal to $\text{PowerCenter}_i$, i.e.

$$F(\text{PowerCenter}_i, \rho, \Lambda) = \text{PowerCenter}_i \qquad (4)$$

in which case the method of FIG. 7 reduces to the conventional finger assignment method that assigns fingers based only on their relative power.

The cross-correlation $\rho$ can be one of the following $$\rho = \frac{\text{Re} \sum_{k=1}^{N} \left( ch_{\text{Finger}_i}(k) \cdot ch^*_{\text{Finger}_j}(k) \right)}{\sum_{k=1}^{N} \left| \left( ch_{\text{Finger}_i}(k) \cdot ch^*_{\text{Finger}_j}(k) \right) \right|} \qquad (5)$$

or $$\rho = \frac{\left| \sum_{k=1}^{N} ch_{\text{Finger}_i}(k) \cdot ch^*_{\text{Finger}_j}(k) \right|}{\sqrt{\sum_{k=1}^{N} |ch_{\text{Finger}_i}(k)|^2 \cdot \sum_{k=1}^{n} |ch^*_{\text{Finger}_j}(k)|^2}} \qquad (6)$$

where $ch(k)_{\text{Finger}_i}$ is the channel estimate for $\text{Finger}_i$, $\text{Finger}_j$ is the finger closest to $\text{Finger}_1$, $(\bullet)^*$ stands for the complex conjugate of the bracketed expression and the sum is over a pre-specified length of time.

If $\Lambda < T_c$, $F(\text{PowerCenter}_i, \rho, \Lambda)$ can be defined as:

$$F(\text{PowerCenter}_i, \rho, \Lambda) = \text{PowerCenter}_i * f(\rho)$$

where the function $f(\rho)$ is any function, for example:

| Case | Function f(ρ) |
|---|---|
| $\rho < 0.35$ | 1.0 |
| $0.35 < \rho < 0.45$ | 0.9 |
| $0.45 < \rho < 0.55$ | 0.8 |
| $0.55 < \rho < 0.65$ | 0.66 |
| $0.65 < \rho < 0.75$ | 0.52 |
| $0.75 < \rho < 0.85$ | 0.38 |
| $0.85 < \rho < 0.92$ | 0.23 |
| $0.92 < \rho < 1.0$ | 0.14 |

In step 72, a similar calculation is performed for the new finger candidate and CompositeFingerCandidatePower is computed. It will be appreciated that function $F(\bullet,\bullet,\bullet)$ and $\rho$ calculation can be different for step 70 and step 72, and other choices of function can be used, e.g. $\rho$ can be calculated by incorporating an exponential forgetting factor.

In step 73, two different branches are examined. If the number of fingers currently used equals the maximum number allowed (i.e. all rake fingers are active), the first branch has to be executed. In this branch CompositeFingerCandidatePower is compared (step 77) with the minimum of all CompositeFingerPower's. If it is greater than this minimal power, then the finger, associated with minimal CompositeFingerPower, is moved to the location (timing) of the new finger candidate (step 78). Finally, in step 79, a redefinition of the finger blocks is taking place. If CompositeFingerCandidatePower is less than this minimal power, no fingers are moved.

If the number of fingers currently used is less than the maximum number allowed, CompositeFingerCandidatePower is compared (step 74) to a threshold NewFingerThreshold. If it is greater than the threshold, then a new finger is added (step 75) and a redefinition of the finger blocks is taking place (step 76). Otherwise, the new finger candidate is not added to the rake receiver.

FIG. 8 illustrates the removal of an existing finger from a finger block, comprised from two fingers, such as might be periodically performed. The method of FIG. 8 is performed periodically to remove fingers. The conventional method for switching off a finger is to do so when the finger power measurements are low relative to other fingers. This criterion is not effective for removing a finger from a finger block. The present invention uses the following FingerCost function to evaluate whether a finger in a finger block should be turned off:

$$\text{FingerCost} = \alpha \cdot \min(\text{PowerCenter}_1, \text{PowerCenter}_2) - \rho \cdot C \qquad (8)$$

where $\alpha$ is any desired value between zero and one, $\text{PowerCenter}_1$ and $\text{PowerCenter}_2$ are powers of fingers in the finger block, C is a prespecified constant and $\rho$ is defined in Equations (5) and Equations (6) with i=1 and j=2.

As shown in FIG. 8, initially, the correlation $\rho$ between the two fingers finger_1 and finger_2 is determined (step 80) after which the value of FingerCost is calculated (step 82) and compared (step 84) to a threshold.

If the result is less than the threshold, then the finger having the minimum average power is removed (step 86) and the joint tracking operation is stopped (since there remains only one finger in finger block). Otherwise, no fingers are removed. A similar finger remover mechanism can be defined for finger blocks having three or more fingers.

It will be appreciated by persons skilled in the art that the present invention is not limited by what has been particularly shown and described herein above, rather the scope of the invention is defined by the claims that follow.

What is claimed is:

1. A method used in a receiver having at least two fingers forming a finger block, the finger block tracking at least one path of a multipath channel, the method comprising the steps of:

generating direction metrics of each of a set of possible directions of joint movement of the fingers of said finger block;

selecting one of said direction metrics according to a predetermined criterion; and moving the fingers of said finger block in the directions indicated by said selected direction metric.

2. A method according to claim 1, wherein said selected direction metric is the maximal direction metric.

3. A method according to claim 1, wherein said step of moving adjusts the fingers of said finger block only if said selected direction metric is the maximal direction metric and exceeds a comparison direction metric by at least a predetermined threshold.

4. A method according to claim 1, wherein the method further comprises the step of redefining finger blocks after said step of moving.

5. A method according to claim 1, wherein said finger block is formed of two fingers.

6. A method according to claim 5, wherein said direction metrics are generated for five different directions of joint movement.

7. A method according to claim 5, wherein said direction metrics are generated for six different directions of joint movement.

8. A method according to claim 5, wherein said direction metrics are generated for nine different directions of joint movement.

9. A method according to claim 1, wherein said finger block is formed of two closely spaced fingers.

10. A method according to claim 9, wherein said closely spaced fingers are $7/8$ chip apart.

11. A method according to claim 1, wherein said finger block is formed of three fingers.

12. A method according to claim 1, wherein delays between fingers are set to be no smaller than $7/8$ chip.

13. A method according to claim 1, wherein said step of generating includes the step of time averaging said direction metrics by summing consecutive direction metrics.

14. A method according to claim 13, wherein said step of time averaging uses a forgetting factor.

15. A method according to claim 1, wherein said direction metrics are based on power estimation.

* * * * *